Inventors:
HELMUT KOBUSCH
JOHANNES GRUNER
ARNOLD PFEIFFER

BY:
J. Edward Mestern

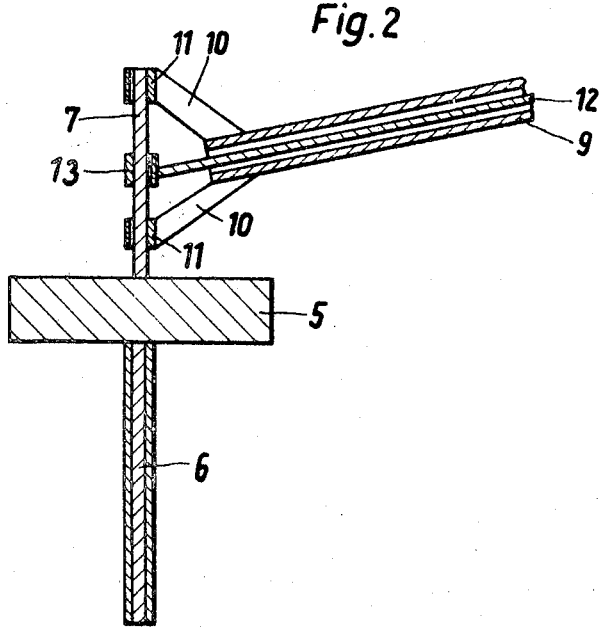
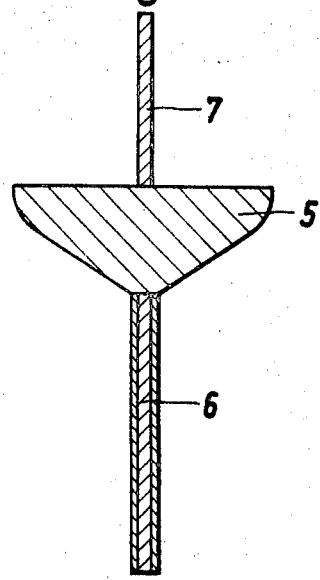
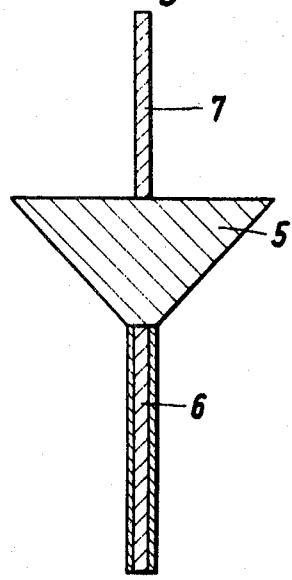

United States Patent Office 3,459,209
Patented Aug. 5, 1969

3,459,209
SLAG RETAINING DEVICE FOR USE DURING TAPPING OF CONVERTERS
Helmut Kobusch, Duisburg-Mundelheim, and Johannes Gruner and Arnold Pfeiffer, Duisburg-Huckingen, Germany, assignors to Mannesmann Aktiengesellschaft, Dusseldorf, Germany
Filed Aug. 30, 1967, Ser. No. 664,552
Claims priority, application Germany, Sept. 26, 1966, M 71,064
Int. Cl. F16k *1/36, 31/44;* B22d *45/00*
U.S. Cl. 137—172            9 Claims

ABSTRACT OF THE DISCLOSURE

A device for the separation of slag and its retention in a tapping converter which consists of a closure having a specific gravity lower than that of the steel produced in the converter but higher than that of the slag. The closure is provided with guide means reaching into the tap hole of the converter, and a release mechanism.

---

Figure 1:
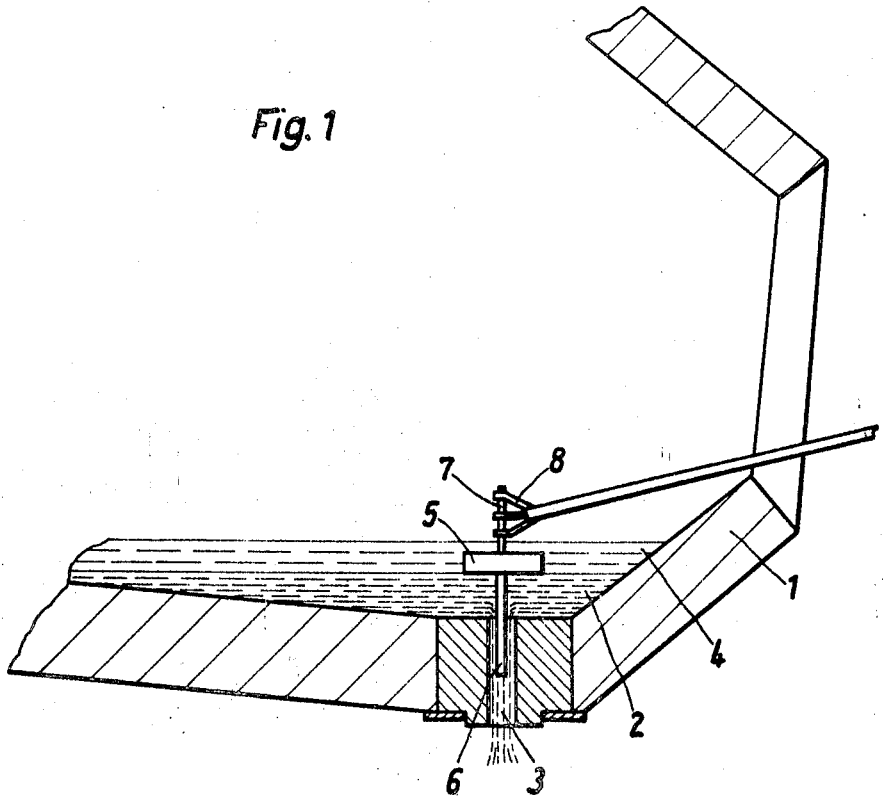

The invention relates to a slag retaining device for use in tapping converters during the tapping of steel therefrom.

The steel industry has long been confronted with the problem of tapping steel free from slag. Devices are known which serve this purpose. For instance, in Thomas converters, blocking bodies are employed whose specific gravity is considerably higher than that of the slag, but lower than that of the steel produced. Thus, the blocking body sinks into the slag and floats on the surface of the metal. Given a suitable shape, this body retains the slag in the converter mouth during emptying while the steel flows off below. However, such devices are not usable in tapping converters owing to a different method of withdrawal.

It is the object of the invention to provide an automatic device which enables separation of steel from slag during the emptying of tapping converters. This is acomplished by shaping a body floating on top of the metal bath as a closure whose lower side is provided with a guide bar engaging in the tap hole and whose upper side carries a rod supporting a release mechanism. The diameter of the closure acording to the invention is at least twice that of the tap hole. The volumetric weight of the closure is 1.1–1.8 the specific gravity of the liquid slag. Changes in the shape of the tap hole owing to wear and erosion is compensated for by adapting the shape of the closure thereto.

The tap hole is closed by introducing the body according to the invention while the converter is in horizontal position and lowering it onto the metal bath with the aid of the release mechanism; the guide bar is lead into the tape hole, and the closure, floating on the meal bath, seals the tap hole when all metal has flown off.

The advantages of the device described and of the method used reside in avoiding rephosphorization, prevention of roasting of aluminum, silicon and manganese in the ladle by the FeO— containing converter slag, and considerable extension of the working life of the ladle. Moreover, retention of the slag is a prime condition for effective metallurgical post-treatment of the melt in the ladle, for instance, scavenging gas treatment.

It has been established that the volumetric weight of the closure floating on the steel bath must be held within definite limits in order to ensure that the closure is capable of penetrating even a viscous slag, while, on the other hand, the tap hole should be sealed off only after all steel has flown off. This is reliably attained by keeping said volumetric weight between 1.1 and 1.8 times the specific gravity of the slag. The suitable volumetric weight is obtained by selecting a firebrick or refractory stone of suitable specific gravity or else using a lighter stone or brick which is weighted with metal reinforcing struts or plates.

The invention now will be more fully explained with reference to the acompanying drawings. However, it should be understood that these are given merely by way of illustration, and not of limitation, and that it is intended to cover all modifications and variations which do not constitute departures from the spirit and the scope of the invention as hereinafter claimed.

In the drawings:
FIG. 1 is a schematic of a longitudinal section through a converter showing a tap hole on the bottom and the closure in floating position;
FIG. 2 is an elevation of an embodiment of a closure;
FIGS. 3 and 4 are elevations showing two further embodiments of the actual closure.

Referring now to these drawings, converter 1 is in tapping position so that the molten steel 2 can run off through tap hole 3. Slag 4, due to its lower specific gravity, floats on top of steel 2. Above the tap hole 3, the closure according to the invention is disposed. The same consists of a closing body 5, shown here in the form of a disc, made of a fireproof material and having a diameter which is at least twice that of tap hole 3. At the underside of the disc 5, a guide bar 6 is disposed which is either metal rod jacketed with a fireproof material or else is of fireproof material itself, e.g., refractory stone. Guide bar 6 engages in the tap hole 3 and serves to center the closure. Disc 5, at its upper side, carries a rod 7 which is connected, near its upper end, to a release mechanism 8 to disengage it when desired. The release mechanism 8 consists of a tube 9 which carries, at the end facing rod 7, two or more braces 10. The opposite ends of braces 10 have holes which acommodate rod 7. Within tube 9, a bar 12 is disposed which protrudes beyond both ends of tube 9. Bar 12 ends in a tubular piece 13 through which rod 7 passes. The opposite end of bar 12 is connected to a sension device of known construction (not shown in the drawing), and bar 7 thereby can be arrested. When the tension device is released, the closure drops out of the release mechanism which then can be removed from the converter.

The shape of closure 5 shown in FIG. 2 is particularly useful when the brickwork of the converter is still new. The flat disc with its even bottom surface assures good sealing of the tap hole. However, after approximately 100 melts, the edges of the tap hole are badly eroded so that this type of closure is no longer effective. Then it is opportune to adapt the shape of the closure to the changes of the tap hole. The embodiments shown in FIGS. 3 and 4 have been found suitable and have a drop shape or conical shape, respectively.

The operation of the closure device according to the invention is carried out by introducing the same into converter 1, leading guide bar 6 into tap hole 3. This keeps the closure 5 afloat above the tap hole after disengaging it from the release mechanism 8. With sinking liquid level, the closure descends and seals the tap hole after all steel has flown out. In order to safely retain all the slag, the closure can be set in sealing positon even before all steel has been drawn off, e.g., when, say 200–300 kg. steel still are present in the converter together with the steel. If, for instance, the slag is to remain in the converter for the next charge, the converter is raised rapidly and residual steel also remains therein. However, it also is feasible to empty this residual amount of steel, whereby a small quantity of slag may flow off in a weak stream. To prevent this, a nozzle may be disposed at the tap hole, blowing compressed air over the edges of the ladle.

The slag remaining in the converter is removed therefrom in the customary manner.

We claim as our invention:

1. A device for the retention of slag during drawing off of steel from a tapping converter provided with a tap hole, device comprising a closure having a specific gravity lower than said steel but higher than said slag and of a size to effectively seal said tap hole; said closure carrying at its underside guide means engaging in said tap hole; and, at its top side, a rod; said rod being connected to release means detachably connected thereto for introduction of the device into the converter.

2. The device as defined in claim 1, wherein said closure has a diameter at least twice that of said tap hole.

3. The device as defined in claim 1, wherein said closure is in the shape of a disc.

4. The device as defined in claim 1, wherein said closure is in the shape of a cone.

5. The device as defined in claim 4, wherein the taper of said cone engages in said tap hole when in sealing position.

6. The device as defined in claim 1, wherein said closure has a drop shape.

7. The device as defined in claim 1, wherein the specific gravity of said closure is 1.1 to 1.8 times the specifiic gravity of the slag.

8. The device as defined in claim 1, wherein said release means comprise a tube; at least two braces attached to one end of said tube, said braces having tubular ends to accommodate said rod; a bar traversing, and extending beyond both ends of said tube and having a tubular end accommodating said rod; and tensioning means at the opposite end of said bar, release of said tensioning means effecting disengagement of said rod from said tubular ends of said bar and said braces.

9. A device for the retention of slag during drawing off of steel from a tapping converter provided with a tap hole, said device comprising a closure having a specific gravity of 1.1 to 1.8 times that of said slag and a diameter at least twice that of said tap hole; said closure carrying at its underside a guide bar engaging in said tap hole; a rod attached to the top side of said closure; and a release mechanism detachably connected to said rod; said mechanism comprising a tube; at least two braces attached to the end of said tube facing said rod and having tubular ends accommodating said rod; a bar traversing, and extending beyond both ends of said tube and having a tubular end accommodating said rod; tensioning means disposed at the opposite end of said bar; release of said tensioning means effecting disengagement of said bar from said tubular ends.

References Cited

UNITED STATES PATENTS

| 1,140,666 | 5/1915 | Cummings | 137—399 |
| 1,558,004 | 10/1925 | Feugere | 137—399 |
| 2,551,404 | 5/1951 | Wiggins | 137—172 X |
| 3,201,837 | 8/1965 | Sylvester | 164—337 X |

FOREIGN PATENTS 583,846  9/1933  Germany.

ALAN COHAN, Primary Examiner

U.S. Cl. X.R.

137—399, 433; 164—337